US012586935B2

(12) United States Patent
Maricevic et al.

(10) Patent No.: US 12,586,935 B2
(45) Date of Patent: Mar. 24, 2026

(54) METHODS OF DELIVERING POWER TO COMMUNICATIONS NETWORK EQUIPMENT AND RELATED SYSTEMS AND COAXIAL CABLES

(71) Applicant: ARRIS Enterprises LLC, Suwanee, GA (US)

(72) Inventors: Zoran Maricevic, West Hartford, CT (US); Marcel Schemmann, Maria Hoop (NL); John O. Caezza, Farmington, CT (US); Brian J. Solomon, Middlefield, CT (US); Eric J. Cormier, Bristol, CT (US)

(73) Assignee: ARRIS Enterprises LLC, Horsham, PA (US)

( * ) Notice: Subject to any disclaimer, the term of this patent is extended or adjusted under 35 U.S.C. 154(b) by 289 days.

(21) Appl. No.: 18/018,397

(22) PCT Filed: Jul. 23, 2021

(86) PCT No.: PCT/US2021/042865
§ 371 (c)(1),
(2) Date: Jan. 27, 2023

(87) PCT Pub. No.: WO2022/026301
PCT Pub. Date: Feb. 3, 2022

(65) Prior Publication Data

US 2023/0291134 A1 Sep. 14, 2023

Related U.S. Application Data

(60) Provisional application No. 63/057,070, filed on Jul. 27, 2020.

(51) Int. Cl.
*H01R 9/05* (2006.01)
*H01R 13/05* (2006.01)
*H01R 13/625* (2006.01)

(52) U.S. Cl.
CPC ............ *H01R 9/05* (2013.01); *H01R 13/052* (2013.01); *H01R 13/625* (2013.01)

(58) Field of Classification Search
None
See application file for complete search history.

(56) References Cited

U.S. PATENT DOCUMENTS 5,015,194 A * 5/1991 Seas .................... H01R 13/625 439/314
5,174,763 A * 12/1992 Wilson .............. H01R 13/2421 439/840

(Continued)

OTHER PUBLICATIONS

International Search Report and Written Opinion in PCT International Patent Application No. PCT/US2021/042865.

*Primary Examiner* — Rexford N Barnie
*Assistant Examiner* — Joel Barnett
(74) *Attorney, Agent, or Firm* — Chernoff, Vilhauer, McClung & Stenzel, LLP

(57) ABSTRACT

Methods of delivering electric power to equipment of a communications access network are provided herein. In particular, a method of delivering electric power to the equipment includes generating an AC power signal having a frequency between 10 kHz and 500 kHz that is transmitted via a coaxial cable that is coupled between the equipment and a power monitor. The method includes identifying, using the power monitor, a reflection of the AC power signal via the coaxial cable to the power monitor. Moreover, the method includes adjusting a voltage of the AC power signal in response to identifying the reflection. Related systems and coaxial cables are also provided.

24 Claims, 12 Drawing Sheets

(56) References Cited

U.S. PATENT DOCUMENTS

| | | | |
|---|---|---|---|
| 5,777,273 | A | 7/1998 | Woody et al. |
| 6,905,350 | B1 * | 6/2005 | Wallash ............. H01R 13/6485 439/88 |
| 2002/0003873 | A1 * | 1/2002 | Rabenko ............... H04M 19/08 379/413 |
| 2004/0155737 | A1 * | 8/2004 | Wakatsuki ............... H01H 9/40 335/78 |
| 2007/0298653 | A1 | 12/2007 | Mahoney et al. |
| 2011/0080158 | A1 | 4/2011 | Lawrence et al. |
| 2014/0321295 | A1 | 10/2014 | Fella, Jr. et al. |
| 2015/0132989 | A1 * | 5/2015 | Wang ................... H01R 13/533 29/857 |
| 2016/0173829 | A1 * | 6/2016 | Olsson ................... H04N 7/183 348/84 |
| 2016/0336696 | A1 * | 11/2016 | Holland ................. H01R 24/46 |
| 2017/0288315 | A1 * | 10/2017 | Scheucher ......... H04B 7/15557 |
| 2020/0133370 | A1 * | 4/2020 | Bonen ..................... G06F 1/305 |
| 2021/0083942 | A1 * | 3/2021 | Finkelstein ............. H04L 41/12 |

* cited by examiner

METHODS OF DELIVERING POWER TO COMMUNICATIONS NETWORK EQUIPMENT AND RELATED SYSTEMS AND COAXIAL CABLES

CROSS-REFERENCE TO RELATED APPLICATION

The present application claims priority to PCT International Patent Application No. PCT/US2021/042865 filed Jul. 23, 2021, which claims the benefit of U.S. Provisional Patent Application No. 63/057,070, filed Jul. 27, 2020, the entire contents of which are incorporated herein by reference.

FIELD

The present disclosure relates to power delivery to communications network equipment.

BACKGROUND

The final leg, which may also be referred to as the "last mile" or "access network," of a communications network that delivers a communications service to end-users (e.g., subscribers) may include active equipment that requires power in addition to Radio Frequency ("RF") signals. Various types of networks, including wireless (e.g., cellular and/or community Wi-Fi) and/or wired networks, such as Hybrid Fiber Coax ("HFC") and/or Fiber to the Premises ("FTTP"), can be used in the final leg. In many cases, power delivery to active elements of an access network is necessary, in addition to having to deliver bandwidth/data-throughput capacity.

Passive Optical Networks ("PON"), which are a type of FTTP, are one exception in which power may not be required. Other types of FTTP, however, may require some power, such as Hybrid Passive Optical Networks ("UPON"), in which each active splitting cabinet may use, for example, 100 Watts ("W") of power.

Other wired networks may rely on field-powered active elements even more. For example, an HFC service group area, which may serve hundreds of Homes Passed ("HP"), may rely on (a) Fiber-Deep ("FD") nodes as active elements, which may require about 500 W of power, or on (b) an HFC fiber node followed by RF amplifiers, which may require about 1,200 W for the same area. Power to these active elements is typically distributed over the same coaxial cable that RF signals are, using a square-wave 60 Hertz ("Hz") signal, with voltages of up to 90 Volts ("V") and currents of up to 15 Amps ("A"), which limits the total power deliverable to about 1,350 W.

Wireless access networks may further escalate the level of power needed. For example, a mini cell tower (e.g., with six sectors/antennas) may require more than 2 kilowatts ("kW") of power. Even more power may be demanded with the 5G-driven increase of density of a particular area served. Unlike for wired networks, where less than 92 V of power may not require trained electricians to install and maintain the network, wireless access may rely on dedicated power cables, with +/−190 V Direct Current ("DC") delivery as one example, and very heavy gauge wires (e.g., 8 or 10 American Wire Gauge ("AWG")), to reach several thousands of feet with high currents, yet with minimal voltage drop/power loss in the cables.

In all three cases (FTTP, HFC, and wireless), power delivery may be a mission-critical, yet cost-intensive, aspect of designing and operating these networks. furthermore, additional capacity demand may increase the amount of power required. In all of these cases, either Alternating Current ("AC") (e.g., 60 Hz) or DC may be used for power. Moreover, network designers/operators face a trade-off between using (a) as high of a voltage for powering as possible, to reduce current draw and cable losses, and (b) a voltage that is sufficiently low to protect the safety of personnel installing and maintaining those access networks.

SUMMARY

A system that is configured to deliver electric power to equipment of a communications access network, according to some embodiments herein, may include a coaxial cable that is coupled between a power generator and the equipment of the communications access network, and that is configured to deliver AC power having a frequency between 10 kilohertz ("kHz") and 500 kHz.

In some embodiments, the power generator may include an AC power source that is configured to generate a signal having the frequency between 10 kHz and 500 kHz. The power generator may include a DC power source. Moreover, the AC power source may be coupled between a first end of the coaxial cable and the DC power source.

According to some embodiments, the system may include a voltage rectifier that is configured to convert the AC power to DC power. The voltage rectifier may be coupled between a second end of the coaxial cable and the equipment of the communications access network.

In some embodiments, the system may include a power monitor that is coupled between the AC power source and the coaxial cable. The power monitor may be configured to identify a reflection of the signal via the coaxial cable to the power monitor. Moreover, the AC power source may be configured to adjust an AC voltage that it outputs, in response to the power monitor identifying the reflection.

According to some embodiments, the AC power source may include a resonant converter that is configured to adjust the AC voltage. Moreover, the AC power may include a voltage of 250 Volts or higher.

In some embodiments, an end of the coaxial cable may include a spring. For example, the spring may be a dielectric spring that extends around a center conductor pin having an end that faces an end of a center conductor of the coaxial cable, the end of the center conductor may be electrically connected to the end of the center conductor pin when the dielectric spring is compressed, and the end of the center conductor may be electrically disconnected from the end of the center conductor pin when the dielectric spring is relaxed. The end of the center conductor may protrude beyond an end of an inner dielectric insulator of the coaxial cable and may include an arc-suppression material that is different from a material of a portion of the center conductor that is surrounded by the inner dielectric insulator, and a connector on the end of the coaxial cable may extend around the end of the center conductor and the end of the center conductor pin. Moreover, the system may include a bayonet connector on the end of the coaxial cable, and the bayonet connector may extend around the end of the center conductor pin. As another example, the spring may be a metal spring that extends around a center conductor pin having an end that faces an end of a center conductor of the coaxial cable, the end of the coaxial cable may include an annular dielectric ring that is inside the metal spring or between the metal spring and the end of the center conductor, the end of the center conductor may be electrically connected to the end of the center conductor pin when the metal spring is compressed, and the end of the center conductor may be electrically disconnected from the end of the center conductor pin when the metal spring is relaxed. Moreover, the system may include a bayonet connector on the end of the coaxial cable, and the bayonet connector may extend around the annular dielectric ring and the end of the center conductor pin.

According to some embodiments, the equipment may be outdoor equipment of the communications access network. Moreover, the system may include a fiber cable that is coupled to the coaxial cable, and the fiber cable and the coaxial cable may both be coupled between the power generator and the equipment of the communications access network.

A coaxial cable, according to some embodiments herein, may include a center conductor. The coaxial cable may include a center conductor pin having an end that faces an end of the center conductor. The coaxial cable may include a spring that extends around the center conductor pin. The end of the center conductor may be electrically connected to the end of the center conductor pin when the spring is compressed. Moreover, the end of the center conductor may be electrically disconnected from the end of the center conductor pin when the spring is relaxed.

In some embodiments, the spring may be a dielectric spring. Moreover, the coaxial cable may include an inner dielectric insulator that surrounds a portion of the center conductor. The coaxial cable may also include a connector that extends around the inner dielectric insulator, the end of the center conductor, and the end of the center conductor pin. The end of the center conductor may protrude beyond an end of the inner dielectric insulator and may include an arc-suppression material that is different from a material of the portion of the center conductor that is surrounded by the inner dielectric insulator.

According to some embodiments, the coaxial cable may include a bayonet connector that extends around the end of the center conductor pin.

In some embodiments, the coaxial cable may include an annular dielectric ring that is inside the spring or between the spring and the end of the center conductor, and the spring may be a metal spring. Moreover, the coaxial cable may include a bayonet connector that extends around the annular dielectric ring and the end of the center conductor pin.

According to some embodiments, the coaxial cable may include a movable dielectric stop that is between the spring and the end of the center conductor, and the spring may be a metal spring. Moreover, the coaxial cable may include a bayonet connector that extends around the movable dielectric stop and the end of the center conductor pin. The movable dielectric stop may be configured to retract from between the end of the center conductor pin and the end of the center conductor, in response to rotating the bayonet connector.

A method of delivering electric power to equipment of a communications access network, according to some embodiments herein, may include generating an AC power signal having a frequency between 10 kHz and 500 kHz that is transmitted via a coaxial cable that is coupled between the equipment and a power monitor. The method may include identifying, using the power monitor, a reflection of the AC power signal via the coaxial cable to the power monitor. Moreover, the method may include adjusting a voltage of the AC power signal in response to identifying the reflection.

In some embodiments, generating the AC power signal may be performed by a resonant converter that is coupled between a DC power source and the power monitor. Moreover, adjusting the voltage may be performed by the resonant converter.

According to some embodiments, the method may include electrically connecting an end of the coaxial cable to the power monitor or to a voltage rectifier that is coupled between the equipment and the coaxial cable. The end of the coaxial cable may include: a center conductor; a center conductor pin having an end that faces an end of the center conductor; and a spring that extends around the center conductor pin. Electrically connecting the end of the coaxial cable may include compressing the spring to electrically connect the end of the center conductor pin with the end of the center conductor. Moreover, the method may include retracting a dielectric stop from between the end of the center conductor pin and the end of the center conductor, in response to rotating a bayonet connector that is on the end of the coaxial cable.

In some embodiments, the method may include identifying a break in the coaxial cable in response to identifying the reflection. Identifying the break may include locating a position of the break in the coaxial cable in response to identifying the reflection. Moreover, adjusting the voltage may include reducing the voltage in response to identifying the break.

DETAILED DESCRIPTION

Figure 1:
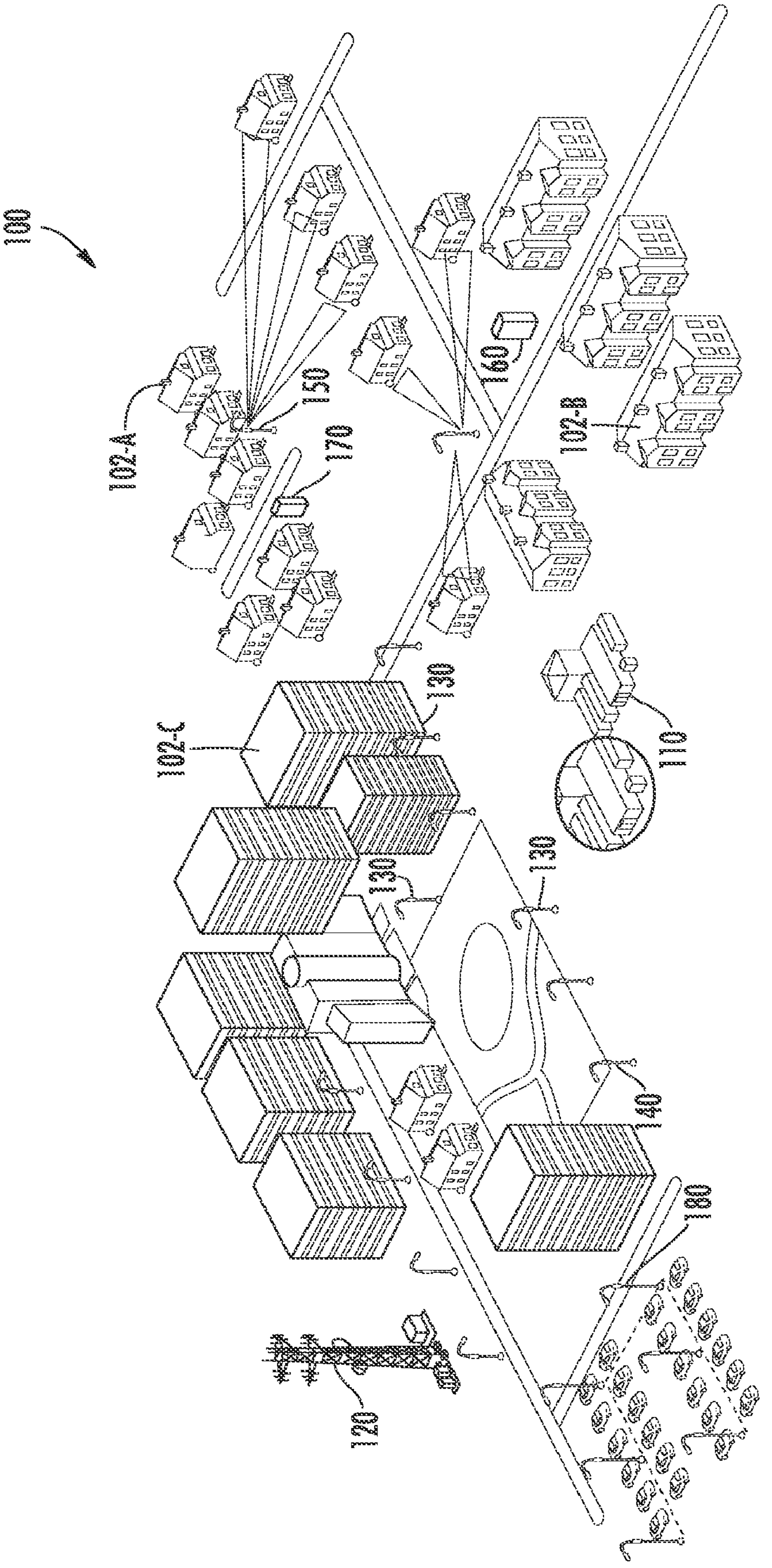
FIG. 1 is a schematic diagram illustrating the increasing data connectivity needs for information and communication technology infrastructure.

The present inventive concepts re-examine some of the traditional assumptions about power delivery, while also considering safety requirements and the amount of power that needs to be delivered. For example, the use of conventional AC power having 60 Hz (or 50 Hz, such as in Europe or much of Asia) for access network power distribution is driven by what is readily available from an electric utility. By contrast, embodiments of the present inventive concepts may deliver power with frequencies ranging from about 10 kHz to about 500 kHz. As demonstrated by Nikola Tesla, the human nervous system may be insensitive to currents with such frequencies. The exact frequency selection in this range may be a trade-off between (a) reduced personnel safety risk, which may favor the higher part of the range, and (b) reduced transmission line losses, which may favor the lower part of the range.

As another example, conventional cables for power delivery often use pairs of wires, which may be expensive, leakage-prone, and current-limited for a long distance. By contrast, embodiments of the present inventive concepts may deliver higher-frequency power via coaxial cable. Using coaxial cable, instead of wire pairs, for carrying high-power signals ranging from about 10 kHz to about 500 kHz has several benefits. First, power signal leakage and interference can be drastically reduced by using coaxial cable. Also, power losses using coaxial cable can be of constant percentage, regardless of the power delivered. For example, by combining the two equations (i) power P=V*I and (ii) voltage V=I*Z (where I and Z denote current and characteristic impedance, respectively), P=Z*(I^2) and losses are proportional to I^2 so that the loss fraction/percentage is constant. Second, for the same DC loop resistance, the cost of coaxial cable is often lower than the cost of high-gauge pairs of wires. This is driven by both the scale of production (e.g., thousands of miles of hardline coaxial cable versus relatively special-purpose large AWG cables) and the cost of raw materials (e.g., mainly lower-cost aluminum for hardline coaxial cable versus mainly higher-cost copper for wire pairs).

To successfully deliver the higher-frequency power via coaxial cable, both (i) a generator of the power and (ii) a power-receiving side may need to obey transmission-line impedance matching rules and thereby reduce/minimize mismatch loss. For example, if a 75-Ohm coaxial cable is used for power transmission, both the generator internal load value and the receiving apparatus impedance value should optimally be 75 Ohms or closely matched. Otherwise, in a case of mismatch, high standing waves may occur on the transmission line, resulting in reduced power delivery and higher losses.

In a further example, conventional DC and 50/60 Hz AC cables use utility power methods for connecting and distributing power. In particular, if one end of a conventional cable is connected to power, then an opposite end of the cable is also connected to power. By contrast, embodiments of the present inventive concepts may use a spring-loaded connector on an end of a coaxial cable. Though frequencies ranging from about 10 kHz to about 500 kHz are not likely to affect personnel in the way typical high-voltage AC or DC power signals would, the spring-loaded connector provides a further level of precaution. In particular, the connector is a type of push-on coaxial cable connector in which a center conductor pin that contacts another connector is spring-loaded and detaches electrically from a center conductor of the coaxial cable once the connector is twisted and disconnected from the other connector.

The spring-loaded connector includes a spring that is located in a region of the coaxial cable that would otherwise include a dielectric filling material. A connector disengagement rotation/twist can relax the spring to decouple the pin from the center conductor.

In yet another example, with conventional DC or AC power distribution, a voltage that is as high as safe/allowed may be used over a transmission cable, and then a Switched Mode Power Supply ("SMPS"), at the far end of a distribution network, may be used to generate a powering voltage having desired properties. By contrast, embodiments of the present inventive concepts may eliminate a "chopper" portion of the SMPS and thus reduce the complexity and cost of the SMPS. Because a transported power signal may already be in the range of typical SMPS "chopper" frequencies of operation, it may be sufficient to use a "bridge" rectifier on the receiving side and then proceed with the remaining voltage-regulating stages of the SMPS.

Example embodiments of the present inventive concepts will be described in greater detail with reference to the attached figures.

FIG. 1 is a schematic diagram illustrating the increasing data connectivity needs for information and communication technology infrastructure. As shown in FIG. 1, in an urban or suburban environment 100, a communications provider, such as a cellular network operator, may operate a central office 110 and a macrocell base station 120. In addition, the communications provider may operate a plurality of small cell base stations 130, Wi-Fi access points 140, fixed wireless nodes 150, active cabinets 160 (e.g., for fiber), DSL (e.g., G.fast) distribution points 170, security cameras 180, and the like. FIG. 1 also illustrates a plurality of buildings 102, including single-family houses 102-A, multi-unit commercial and/or residential buildings 102-B, and office/industrial buildings 102-C where cellular or other communications service may be desired.

Figure 2:
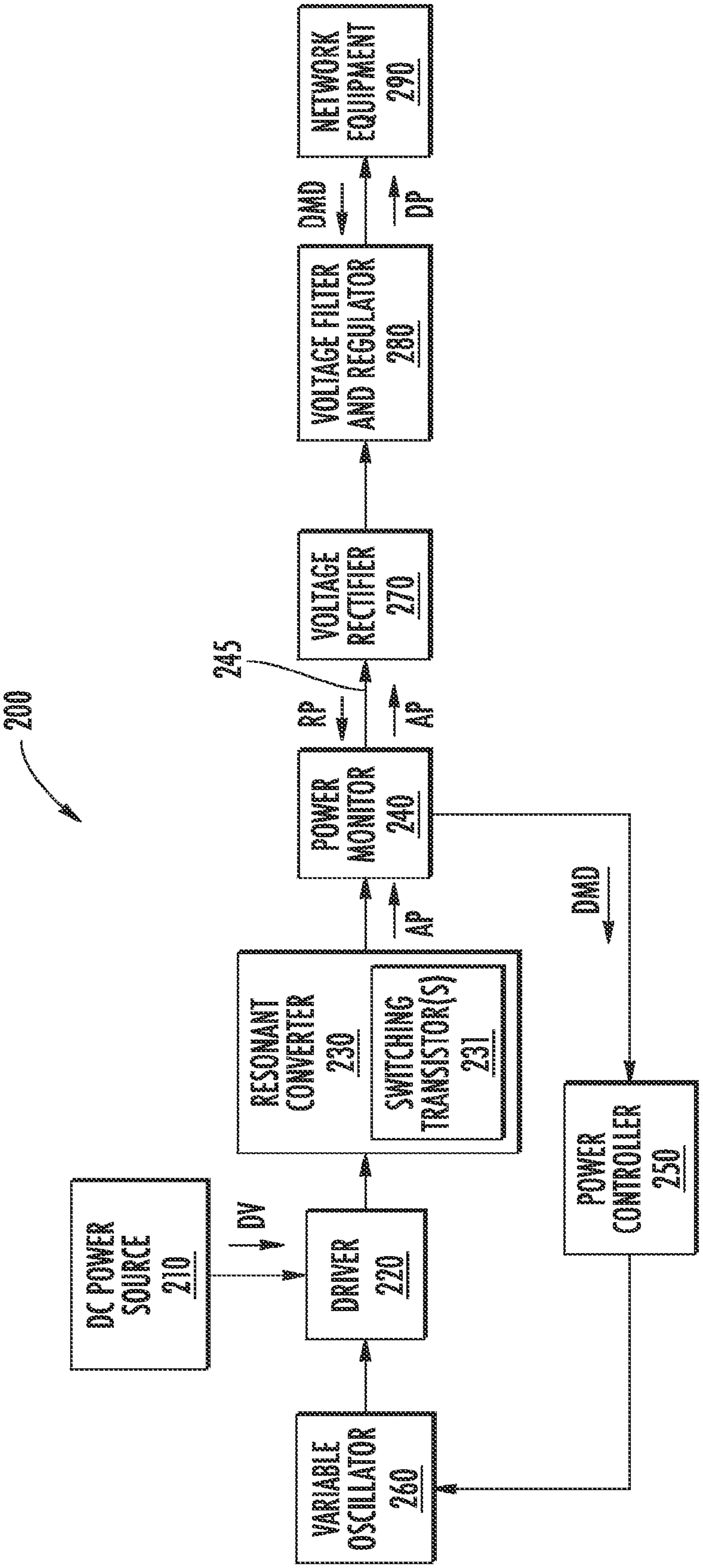
FIG. 2 is a schematic block diagram of a system, according to embodiments of the present inventive concepts, that is configured to deliver electric power to equipment of a communications access network.

FIG. 2 is a schematic block diagram of a system 200, according to embodiments of the present inventive concepts, that is configured to deliver electric power to equipment 290 of a communications access network. The system 200 includes a coaxial cable 245 that is coupled between a power generator and the equipment 290. The power generator may include a DC power source 210 that is configured to output a DC voltage DV to a driver 220, and may further include an AC power source that is coupled to the driver 220 and configured to output AC power AP having a frequency between about 10 kHz and about 500 kHz. In some embodiments, the cable 245 may have an impedance of 75 Ohms, which may advantageously match an impedance of the AC power source, such as an impedance of resonant converter circuitry. Moreover, the cable 245 may be configured to deliver the AC power AP toward the equipment 290.

The AC power source of the system 200 may comprise a resonant converter 230 that is coupled to the driver 220 and configured to generate a signal having the frequency of about 10 kHz to about 500 kHz. In particular, the resonant converter 230 may be coupled between the DC power source 210 (via the driver 220) and a first end of the cable 245. Accordingly, the resonant converter 230 can provide the AC power AP with the frequency of about 10 kHz to about 500 kHz to the cable 245. As an example, the resonant converter 230 may include one or more switching transistors 231 comprising a switching frequency between about 10 kHz and about 500 kHz, as well as one or more resonators coupled to the switching transistor(s) 231 and configured to resonate at a frequency between about 10 kHz and about 500 kHz. The resonant converter 230 may thus be an example of an ultrasound frequency generator. As another example, a switching converter (e.g., a half-bridge converter) may be used as the AC power source of the system 200.

A resonator, such as a resonant circuit comprising at least one capacitor and at least one inductor, of the resonant converter 230 may have a sinusoidal (rather than square-wave) oscillation, which may help to reduce harmonics in the output spectrum. In some embodiments, however, the resonant converter 230 can generate a square-wave oscillation. By comparison with 50/60 Hz power supplies, capacitors in a higher-frequency system can be much smaller. Large electrolytic capacitors tend to be a primary source of failure in outdoor equipment, and these can be avoided by using a higher-frequency power delivery system, such as the system 200. Moreover, the resonant converter 230 may, in some embodiments, comprise a transformer, in addition to capacitors and inductors.

Moreover, a power source/generator, such as the resonant converter 230, may provide a Continuous Waveform ("CW") signal. A conventional approach, by contrast, may include sending a signal from a power generator and then pausing to wait for feedback. In some embodiments herein, the system 200 may "listen," without pausing, from the generator's side by using standing wave change monitoring at the frequency of the CW signal that the generator sends.

In some embodiments, the AC power AP that is provided by the resonant converter 230 may comprise an AC voltage of 250 V or higher. For example, the AC power AP may have an AC voltage between about 300 V and about 1,000 V. Moreover, the cable 245 may support the AC power AP even at power levels above 10 kW, such as up to about 61 kW, depending on an impedance of the cable 245. As an example, implementing the cable 245 with a relatively large cross-section (e.g., ⅞", 1", etc.) can reduce losses and enable higher voltages (and thus power above 10 kW), with a reduced chance for dielectric/air breakdown. Accordingly, the cable 245 may have a total diameter greater than 0.5", such as ⅝", ¾", ⅞", 1", or wider.

A power controller 250 of the system 200 may be configured to control the resonant converter 230 to change the voltage that it outputs. Specifically, though the DC voltage DV that is output from the DC power source 210 may remain constant, the power controller 250 can adjust the AC voltage that is output from the resonant converter 230. Furthermore, the DC power source 210 may, in some embodiments, be omitted from the system 200 and/or replaced with an AC power source. Moreover, a variable oscillator 260 may be coupled between the power controller 250 and the driver 220.

The system 200 may further include a voltage rectifier 270 that is configured to convert the AC power AP to DC power DP that is supplied to the equipment 290. The rectifier 270 may be coupled between the equipment 290 and a second end of the cable 245, and a voltage filter and regulator 280 may be coupled between the equipment 290 and the rectifier 270. The first and second ends of the cable 245 may be opposite ends.

Though only one load (the equipment 290) is shown in FIG. 2, the system 200 may, in some embodiments, deliver power to multiple loads via the same cable 245. For example, the loads may all be close to each other (such as within about 1/10th of a wavelength of the AC power AP) and may collectively provide a desired impedance (e.g., a group impedance of 75 Ohms). After being transmitted through the cable 245, the AC power AP can be split and delivered to the individual loads.

In some embodiments, a fiber cable may be coupled to the first end or the second end of the cable 245. As an example, the cable 245 and the fiber cable may both be coupled between the equipment 290 and the power generator. Alternatively, the cable 245 may be a dedicated coaxial (i.e., coaxial only) cable that extends alongside separate signal-carrying fiber toward the equipment 290.

A power monitor 240 of the system 200 may be coupled between the resonant converter 230 and the first end of the cable 245. The power monitor 240 is configured to identify a reflection RP of a signal that the resonant converter 230 provides to the cable 245. In particular, the reflection RP, which comprises reflected AC power, is transmitted via the cable 245 to the power monitor 240. In response to the identification by the power monitor 240 of the reflection RP, the system 200 may control the resonant converter 230 to adjust an AC voltage that it outputs.

In a transmission line system, it is generally preferred to match transmit and receive impedances to a transmission line impedance to reduce/prevent unwanted reflections. At the power source, an impedance mismatch implies that not all of the available power is coupled to the transmission line. At the receive (load) side, an impedance mismatch implies that a part of the power directed at the receive side is reflected back into the transmission line. As a consequence, power is transported twice through the transmission line: (i) first from source to load and (ii) then a fraction that is reflected back from load to source. This reflected fraction (e.g., the reflection RP) increases unwanted losses in the power transmission. Then, if the power source is not well matched to the transmission line, a fraction of the aforementioned fraction is reflected again, thus resulting in a re-reflection. If, however, the load is well matched, then no power reflection may occur at the load and a re-reflection may also be avoided.

Matching of a load impedance may be of primary importance, and a well-matched load may not necessarily require a well-matched source. For a transmission line impedance Z, such as 75 Ohms, a preferred load impedance may also be Z. This implies that if a Root Mean Square ("RMS") voltage VR is presented to the load, then the load preferably must consume a power $P=V_R\hat{}2/Z$. This means that a power source (e.g., the resonant converter 230) should preferably adjust its output voltage such that, for a load that requires power P (including transmission line and conversion loss), a voltage is output with magnitude $V_R$=square root(P*Z). If this voltage is not output, then reflections (such as the reflection RP) generally will be present in the system 200. The system/power source preferably has means to monitor output voltage and current phase and amplitude. For a known impedance Z, it is known that the relation $V_R=Z*I$ should hold, where I is current. The power controller 250 can adjust the output voltage from the power source to meet this requirement. For example, a feedback loop (e.g., including the power monitor 240 and the power controller 250) can (i) monitor output current and voltage from the power source and (ii) compare these to an expected impedance Z. The power controller 250 can then adjust the output voltage (e.g., $V_R$) to reduce/minimize an error in the equation $V_R=Z*I$.

In some embodiments, the power source can also determine the direction of power transport in a section of transmission line. For example, the power source can determine the direction of power transport with known means such as directional couplers or electronic implementations performing that function.

For multiple loads along a transmission line, an impedance mismatch may implicitly/inherently exist at each load location because the transmission line continues with impedance Z and, at the point where the load is connected, an additional parallel load impedance is present. This mismatch can be remedied with matching networks comprising capacitors, inductors, transformers, or electronic means. It should be noted, however, that if loads are positioned within ⅛th of a wavelength of a high-frequency power signal on the transmission line, then these can generally be lumped together, acting effectively as a single load such that voltage control at the power source is sufficient to reduce reflections. It therefore may be advantageous to place loads along the transmission line within a distance of ⅛th (or even within ¼th) of a wavelength.

Moreover, the power source and load(s) may, in some embodiments, communicate such that the power source knows what power is demanded by the load(s). For example, a load such as the equipment 290, which may provide end-user access to a wired or wireless communications network, may comprise outdoor equipment, such as a small cell base station 130 (FIG. 1), a Wi-Fi access point 140 (FIG. 1), or an active cabinet 160 (FIG. 1). Moreover, the equipment 290 may, in some embodiments, communicate with the system 200 regarding its power demand. As an example, the equipment 290 may transmit a signal DMD indicating its power demand to the power controller 250, which may then instruct the resonant converter 230 to adjust an AC voltage (and/or current) that it outputs.

Figure 3A:
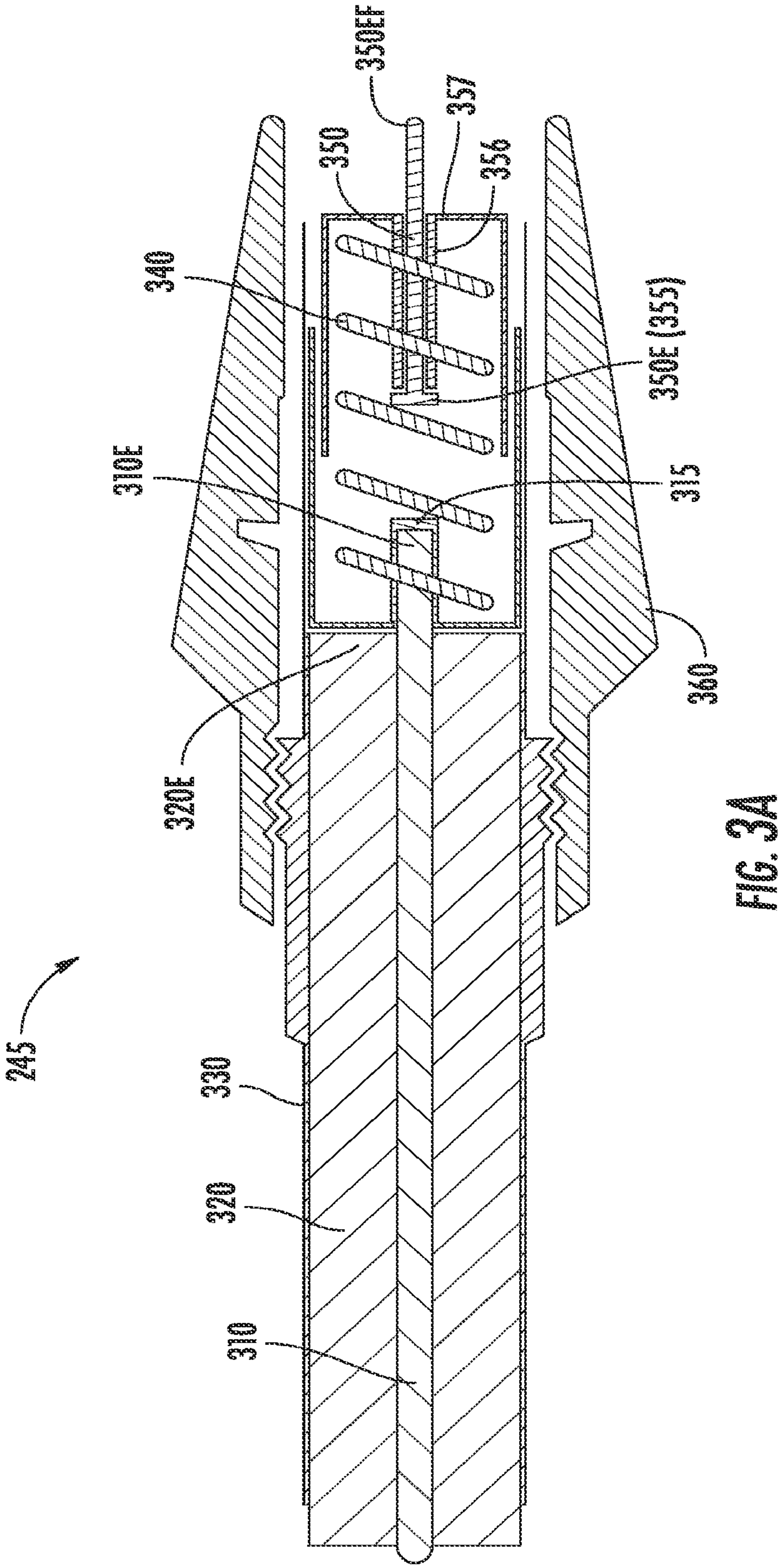
FIG. 3A is a cross-sectional view along a longitudinal dimension of a coaxial cable of FIG. 2.

FIG. 3A is a cross-sectional view along a longitudinal dimension of a coaxial cable 245. In particular, FIG. 3A illustrates the last few inches of length at an end of the cable 245. As shown in FIG. 3A, the end of the cable 245 includes a spring 340. The spring 340 may extend circumferentially around a center conductor pin 350, which has an end 350E that faces an end 310E of a center conductor 310 of the cable 245. The spring 340 and the pin 350 may be configured to move together. By compressing the spring 340, the end 350E of the pin 350 may be electrically connected to the end 310E of the center conductor 310. Conversely, by relaxing the spring 340, the end 350E of the pin 350 may be electrically disconnected from the end 310E of the center conductor 310. For example, the ends 310E and 350E may be brought into and out of physical contact with each other based on whether the spring 340 is compressed or relaxed, and thus may be referred to herein as "contacts."

A dielectric material 356 may surround a middle portion of the pin 350 that is between the end 350E and an opposite end 350EF. Moreover, a dielectric piston 357 may be connected to the pin 350 (e.g., to the dielectric material 356 thereof) such that the piston 357 moves together with the pin 350 along the longitudinal dimension of the cable 245.

In some embodiments, the ends 310E and 350E may have respective arc-suppression materials (e.g., coatings) 315 and 355 thereon. The materials 315 and 355 may each comprise a material different from that of the center conductor 310. For example, the materials 315 and 355 may each comprise tungsten, whereas the center conductor 310 (and/or the pin 350) may comprise copper, gold, or silver. In the absence of the materials 315 and 355, a spark may occur when the ends 310E and 350E contact each other, if the cable 245 is connected to live power. Properties of the spring 340 (e.g., if it is a dielectric spring), together with other aspects of the section of the cable 245 that includes the ends 3 10E and 350E, may affect the impedance of that section and can be selected/optimized for that section to have the same square root of the ratio of inductance to capacitance for that section as the characteristic impedance of the cable 245.

Various modifications are possible with respect to the spring 340. One is to move the spring 340 to the outer shell of the cable 245, in which case the spring 340 can be metallic. Yet another option, applicable to either an inner dielectric spring or an outer metallic spring, is to have a pre-tensioning action for movement of the pin 350 within the cable 245. For example, as a connection is made with the cable 245, and when the ends 310E and 350E are about ¼ of an inch apart from each other, pre-tension in the spring 340 can snap/release and propel the ends 310E and 350E to approach each other at a speed much higher than a speed provided by a hand-created movement on a bayonet mechanism. This faster speed may help to reduce arcing when the ends 310E and 350E contact each other.

A connector 360 may be on the end of the cable 245. In particular, the connector 360 may extend circumferentially around the end 350E and/or the end 310E. For example, the connector 360 may be a bayonet connector, such as a Bayonet Neill-Concelman ("BNC") connector. Steps for connecting a bayonet connector may include the following: First, an initial position of a male bayonet connector may be outside of (e.g., spaced apart from) a female connector 345 (FIG. 3B) that has two or more "engagement pins" on its outside. Second, the engagement pins of the female connector 345 may be aligned, radial angle wise, with two reciprocal openings/slides that are on interior sidewalls of an outer metal shell of the male bayonet connector. Third, the cable side/male bayonet connector may be pushed along those openings/slides to compress/load the spring 340. Fourth, as the male bayonet connector and the engagement pins of the female side travel down the "slide," the slide itself contains a twist, and finishes at a resting/twisted position in which the engagement pins arrive to male side "engagement slots" (e.g., notches) on opposite interior sides of the outer metal shell of the male bayonet connector. This resting/twisted position is shown in FIG. 3C. Moreover, in some embodiments, a BNC-type bayonet can work with the insertion of a pin, and the bayonet can provide a holding force.

The cable 245 also includes an inner dielectric insulator 320 that is between, in a radial direction, the center conductor 310 and a conductive shield 330 of the cable 245. In some embodiments, a diameter of the cable 245 over (i.e., between outer edges of) the insulator 320 may be about 1.3 centimeters ("cm"), and a diameter of the center conductor 310 may be about 0.3 cm. Moreover, the insulator 320 may comprise polyethylene as its dielectric, and thus can provide the cable 245 with a breakdown voltage of about 200 kilovolts ("kV")/cm. The end 310E of the center conductor 310 may protrude, in a longitudinal direction toward the pin 350, beyond an end 320E of the insulator 320. Moreover, the conductive shield 330 and/or the connector 360 (which is electrically connected to the conductive shield 330) may extend circumferentially around the end 310E and the end 350E.

Manufacturing the cable 245 may include removing/coring a section of the insulator 320 to provide a cavity at the end of the cable 245, while leaving the center conductor 310 (and, in some embodiments, the conductive shield 330) exposed at the end of the cable 245. The center conductor 310 can then be clipped down to a certain length beyond the end 320E of the insulator 320. Inner components, such as the spring 340, the piston 357, and the pin 350, can then be pressed into the cavity, and the connector 360 can be pressed on/screw-tightened.

In some embodiments, the spring 340 is a dielectric spring, which advantageously inhibits an accidental electrical connection between the center conductor 310 and the pin 350 via the spring 340. In other embodiments, the spring 340 is a metal spring, which may increase the risk of an accidental electrical connection but which may also have better spring properties, such as elasticity, than a dielectric spring.

Figure 3B:
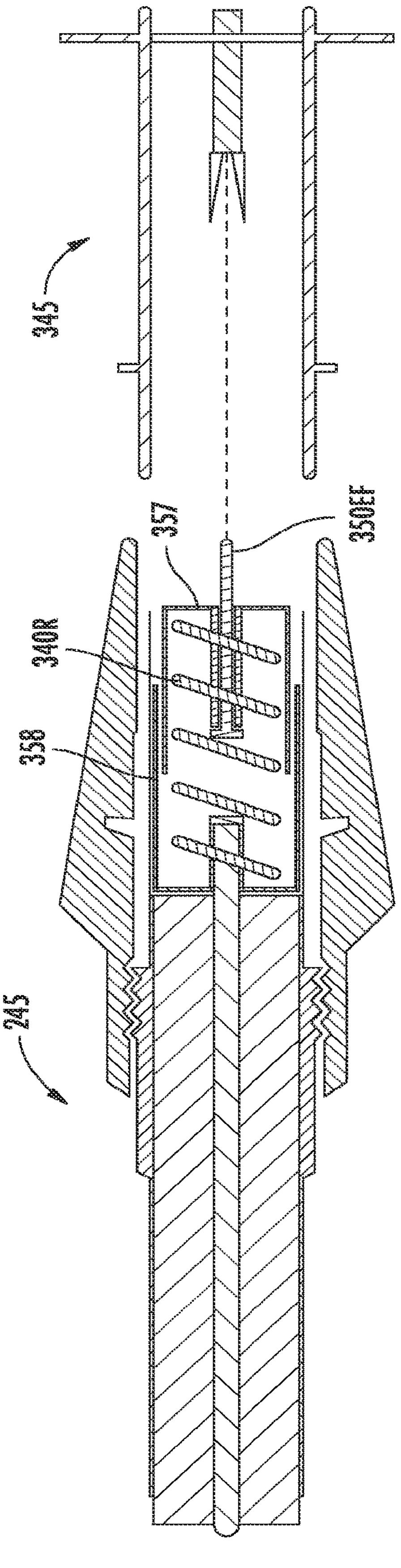
FIG. 3B is a cross-sectional view that illustrates the coaxial cable of FIG. 3A disconnected from an adjacent female connector.
Figure 3C:
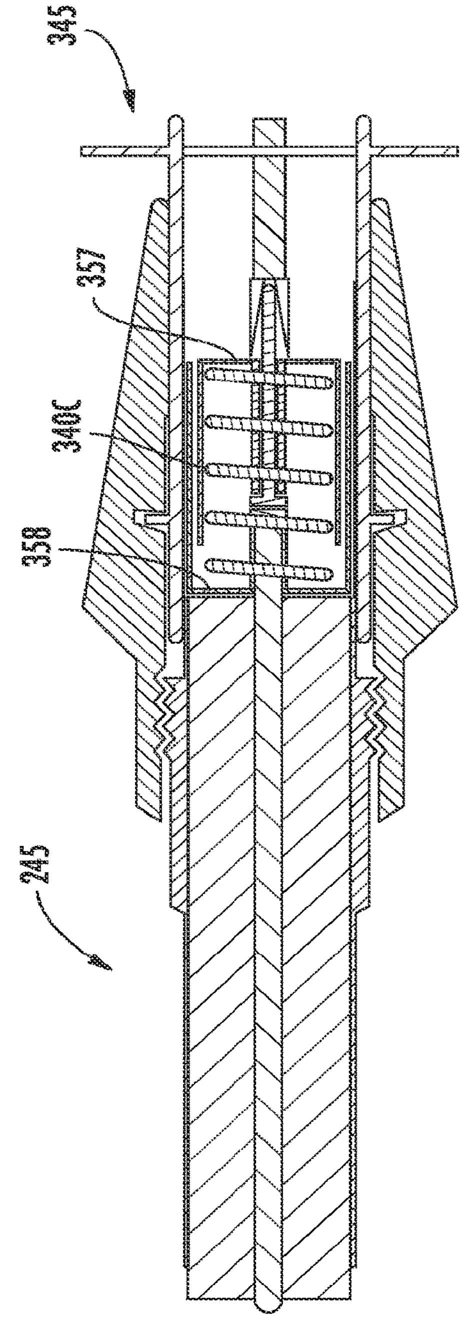
FIG. 3C is a cross-sectional view that illustrates the coaxial cable of FIG. 3A connected to the adjacent female connector of FIG. 3B.

FIG. 3B is a schematic cross-sectional view that illustrates the coaxial cable 245 of FIG. 3A disconnected from an adjacent female connector 345. As shown in FIG. 3B, the spring 340 (FIG. 3A) of the cable 245 naturally has a relaxed state 340R when the cable 245 is disconnected from the connector 345. Also shown in FIG. 3B is a dielectric piston 358 into which the piston 357 can glide along the longitudinal dimension of the cable 245. The piston 358 may be stationary along the longitudinal dimension. In some embodiments, however, it may rotate as a cylinder within its fixed position along the longitudinal dimension. Such rotation may help to reduce friction when the piston 357 glides past the piston 358, such as when pin 350 is pressed in and/or a bayonet mechanism of a connector 360 (FIG. 3A) is rotated.

FIG. 3C is a cross-sectional view that illustrates the coaxial cable 245 of FIG. 3A connected to the adjacent female connector 345 of FIG. 3B. In particular, the end 350EF (FIG. 3B) of the pin 350 (FIG. 3A) has been brought into electrical connection (e.g., physical contact) with the connector 345. As a result, the spring 340 (FIG. 3A) of the cable 245 has been pushed into a compressed state 340C and the end 350E (FIG. 3A) of the pin 350 has been brought into electrical connection with the end 310E (FIG. 3A) of the center conductor 310. Accordingly, the cable 245 having the spring 340 in the compressed state 340C can transmit AC power AP (FIG. 2) to the connector 345 or receive AC power AP from the connector 345. By contrast, the cable 245 having the spring 340 in the relaxed state 340R (FIG. 3B) may be inhibited from transmitting or receiving AC power AP to/from the connector 345.

When the pin 350 is pushed in and a bayonet part of the connector 360 (FIG. 3A) is engaged, the free travel of the spring 340 is such that the spring 340 is compressed sufficiently to establish contact between the ends 310E, 350E. The pistons 357, 358, which house/surround the spring 340, may be free to glide by/along each other and thus enable/further facilitate an orderly spring 340 compression, all the way to the point where the ends 310E, 350E are physically touching each other.

In some embodiments, the spring 340, which may be an "inner spring" that is inside the pistons 357, 358, may be the only spring that the connector 360 includes/surrounds. The travel distance of the spring 340, together with particular positions of "engagement pins/slots" on the outer metal shell of the connector 360, can determine the "connection pressure/force" of the end 350E touching and pressing against the end 310E (e.g., the material 315 thereon). In other embodiments, the outer metal shell of the connector 360 can have additional spring loading. Moreover, operations/features of bayonet engagement/center conductors establishing contact can be implemented in various forms and are not limited to the examples provided herein.

Figure 3D:
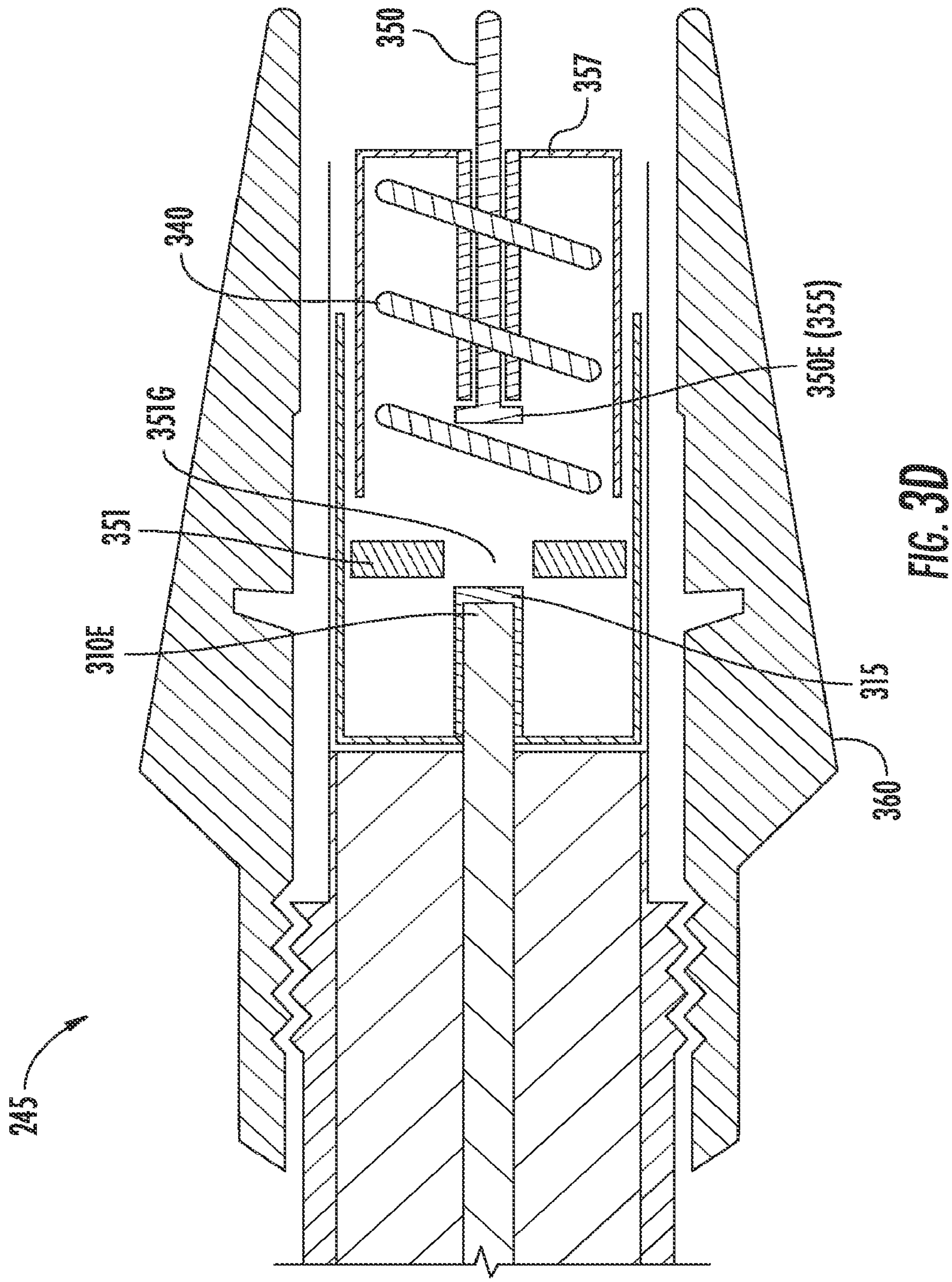
FIG. 3D is a cross-sectional view that illustrates the coaxial cable of FIG. 3A having a dielectric annular ring according to some embodiments of the present inventive concepts.

FIG. 3D is a cross-sectional view that illustrates the coaxial cable 245 of FIG. 3A having a dielectric (e.g., plastic) annular ring 351 according to some embodiments of the present inventive concepts. The ring 351 is between the spring 340 and the end 310E of the center conductor 310. Accordingly, in embodiments in which the spring 340 is a metal spring, the ring 351 can inhibit an electrical connection between the spring 340 and the center conductor 310, and thus may be referred to herein as a "spacer." The center of the ring 351 may have an opening 351G with a fixed diameter that is sufficiently wide for the pin 350 to extend therethrough when the spring 340 is compressed. Moreover, in some embodiments, the ring 351 may be part (e.g., an end) of a dielectric cylinder that is inside the spring 340.

Figure 3E:
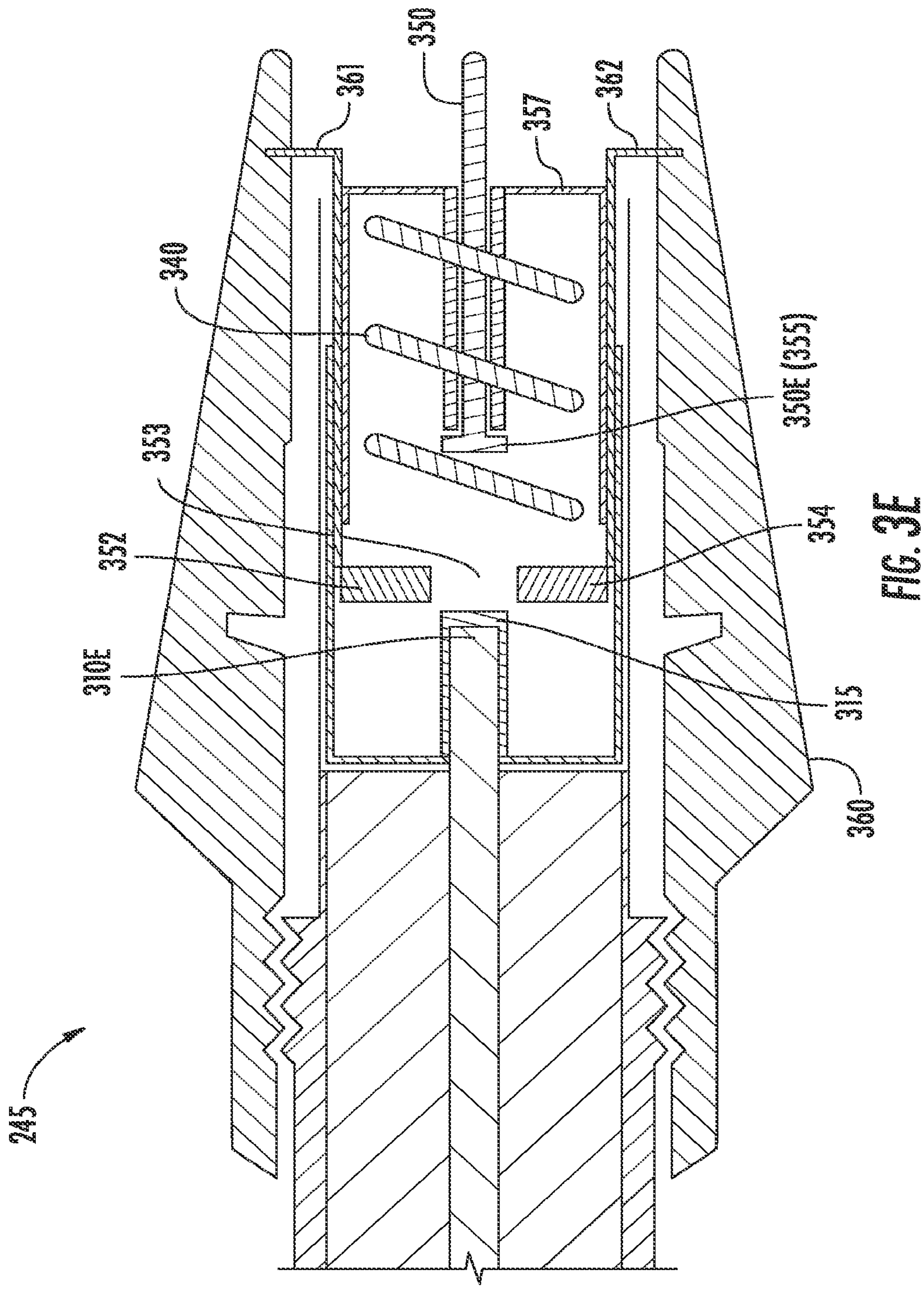
FIG. 3E is a cross-sectional view that illustrates the coaxial cable of FIG. 3A having a movable dielectric stop that is retracted according to other embodiments of the present inventive concepts.

FIG. 3E is a cross-sectional view that illustrates the coaxial cable 245 of FIG. 3A having a movable dielectric (e.g., plastic) stop 352/354 that is retracted according to other embodiments of the present inventive concepts. In particular, unlike the fixed diameter of the opening 351G (FIG. 3D) of the ring 351 (FIG. 3D), a gap 353 between a first dielectric portion 352 of the stop 352/354 and a second dielectric portion 354 of the stop 352/354 has an adjustable diameter because at least one of the portions 352, 354 is movable/retractable. For example, the portions 352, 354 may be connected to physical links 361, 362, respectively, that move when the connector 360 rotates. As an example, the portions 352, 354 can be retracted, via movement of the links 361, 362, from a middle portion of the piston 358 (FIG. 3B) toward opposite sidewalls of the piston 358. By retracting the portions 352, 354 away from each other, the gap 353 can be opened sufficiently wide for the pin 350 to extend therethrough when the spring 340 is compressed.

Figure 3F:
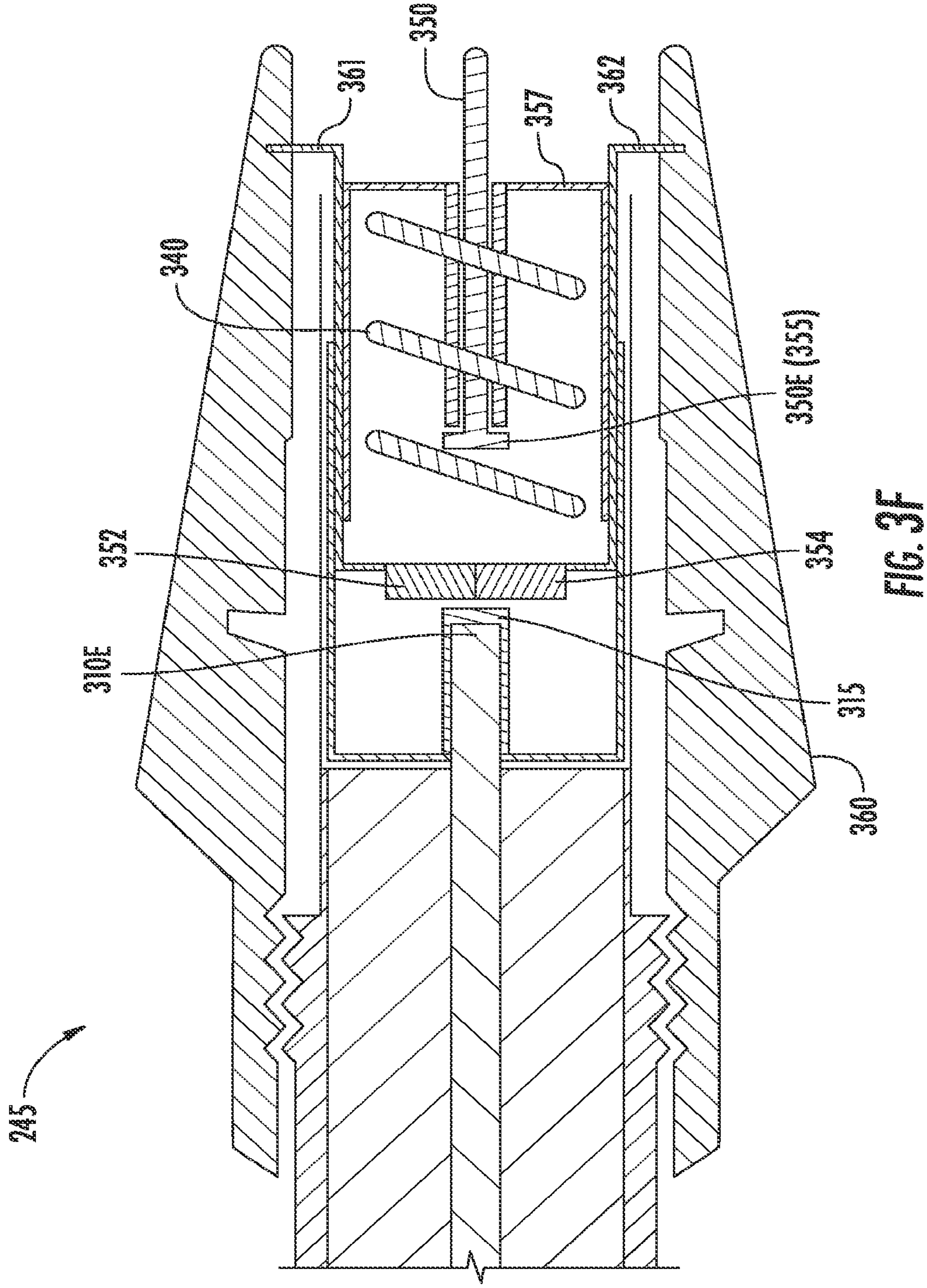
FIG. 3F is a cross-sectional view that illustrates the movable dielectric stop of FIG. 3E while repositioned between a center conductor and a spring-loaded pin.

FIG. 3F is a cross-sectional view that illustrates the movable dielectric stop 352/354 of FIG. 3E while repositioned between the end 310E of the center conductor 310 (FIG. 3A) and the end 350E of the pin 350. By having the spring 340 extend around a circumference of the pin 350, the pin 350 may be a spring-loaded pin. For example, the portions 352, 354 can move laterally, in response to movement of the links 361, 362, from opposite sidewalls of the piston 358 (FIG. 3B) toward the middle portion of the piston 358. By positioning the portions 352, 354 closer to each other, the gap 353 (FIG. 3E) can be sufficiently narrowed to prevent the pin 350 from accidentally extending therethrough when the spring 340 is compressed, such as when a person holding the cable 245 pushes the pin 350 by hand.

Moreover, though shown as having two separate portions 352, 354, the stop 352/354 may alternatively comprise a single dielectric portion (e.g., a dielectric disc) having a notch/opening therein that rotates (e.g., about the longitudinal axis of the cable 245) in/out of the path of the pin 350 when the connector 360 rotates. Accordingly, the single dielectric portion can either (a) block the pin 350 with a dielectric material or (b) allow the pin 350 to pass through the notch/opening, depending on where the notch/opening is rotated in response to rotation of the connector 360.

Because the cable 245 may be a coaxial cable and may support a voltage higher than 190 V, it can deliver significantly higher power than a conventional cable. A breakdown voltage of the cable 245 may ultimately determine a maximum power load that the cable 245 can support. For example, the cable 245 may have a breakdown voltage value of 1,747 V RMS, which can support maximum power handling of about 40 kW at an impedance of 75 Ohms and about 61 kW at 50 Ohms. The cable 245 can thus deliver significantly higher power than a conventional cable that uses a voltage of 90 V or 190 V.

Figure 4A:
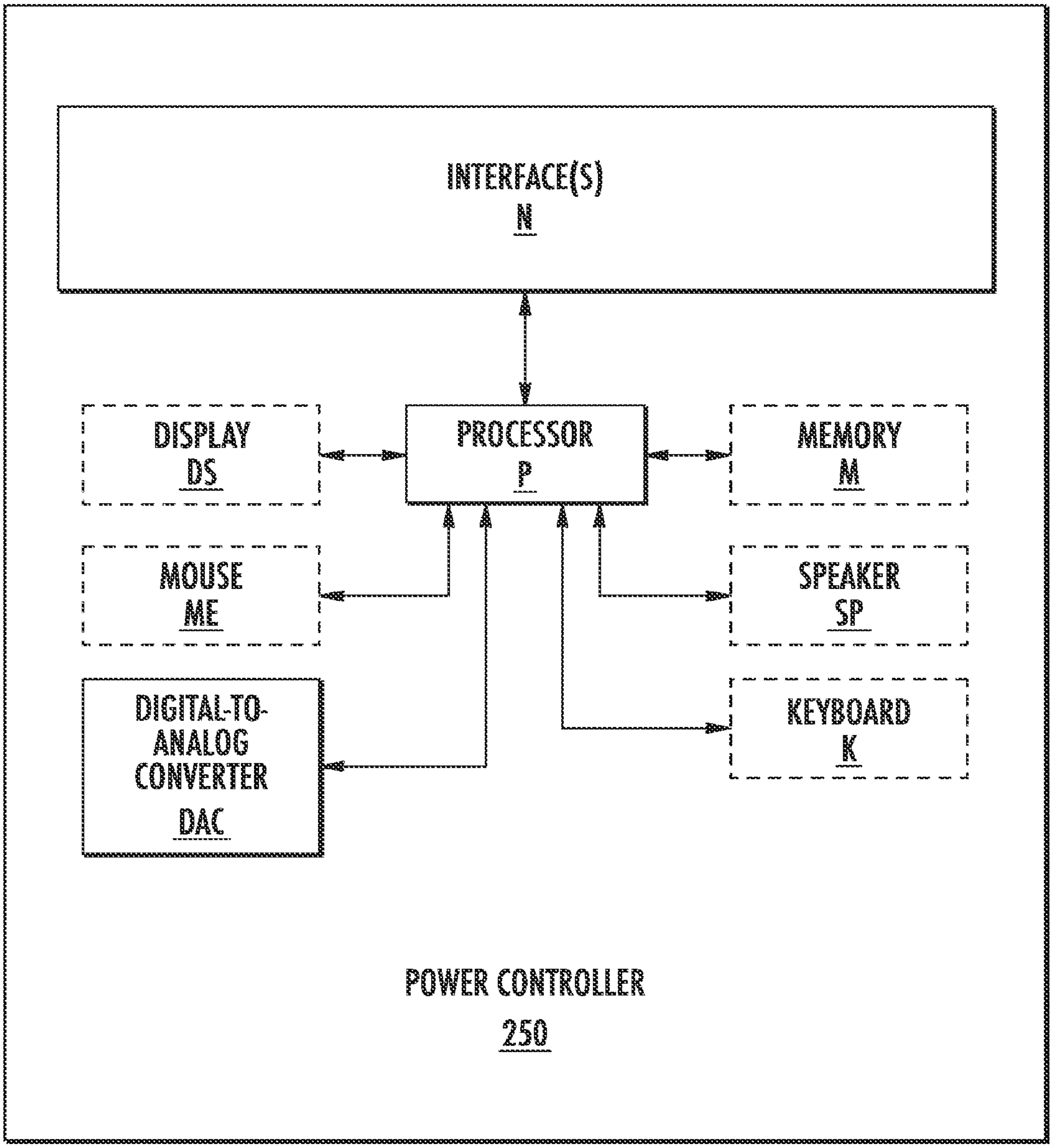
FIG. 4A is a block diagram of a power controller of FIG. 2.

FIG. 4A is a block diagram of the power controller 250 of FIG. 2. The power controller 250 may include a processor P and a memory M, as well as a digital-to-analog converter DAC. The power controller 250 may also include interface(s) N and input/output interface(s), such as a display screen DS, a mouse ME, a keyboard (or keypad) K, and/or a speaker SP. Moreover, the power controller 250 and/or a power monitor 240 (FIG. 2) may include at least one current sensor, voltage sensor, and/or analog-to-digital ("ADC") converter.

The processor P may be coupled to the digital-to-analog converter DAC. The processor P may also be coupled to the interface(s) N, which may include wired and/or wireless interfaces. The processor P may be configured to communicate with network equipment 290 (FIG. 2), the power monitor 240, a variable oscillator 260 (FIG. 2), and/or a resonant converter 230 (FIG. 2) via the interface(s) N. For example, the interface(s) N may include cellular circuitry or short-range wireless communications circuitry, such as Wi-Fi circuitry and/or BLUETOOTH® circuitry. Moreover, the interface(s) N may include a wired interface such as a wired (e.g., Ethernet) local area network ("LAN") interface, a universal serial bus ("USB") interface, or a serial interface. In some embodiments, the interface(s) N may comprise data interfaces to the Internet or other power sources or power loads.

By adjusting an output of its digital-to-analog converter DAC, the power controller 250 can control an adjustment of an output of the resonant converter 230 (or another AC power source) from (a) a first AC voltage to (b) a different, second AC voltage (i.e., having a higher or lower voltage/frequency). For example, the processor P may comprise a microcontroller that is configured to adjust the output of the digital-to-analog converter DAC in response to feedback from a power monitor circuit. As an example, the power monitor 240 can provide feedback to the power controller 250 in response to detecting a reflection RP (FIG. 2) of AC power AP (FIG. 2). The output of the digital-to-analog converter DAC drives the input of a voltage-controlled oscillator (e.g., the variable oscillator 260), which drives one or more switching transistor(s) 231 (FIG. 2) in a resonant converter circuit (e.g., the resonant converter 230). The switching frequency of the transistor(s) 231 sets the output voltage of the resonant converter circuit. In other embodiments, pulse-width control or control by programmable logic, such as by a field-programmable gate array ("FPGA") or a complex programmable logic device ("CPLD"), may generate switching signals for the transistor(s) 231.

Figure 4B:
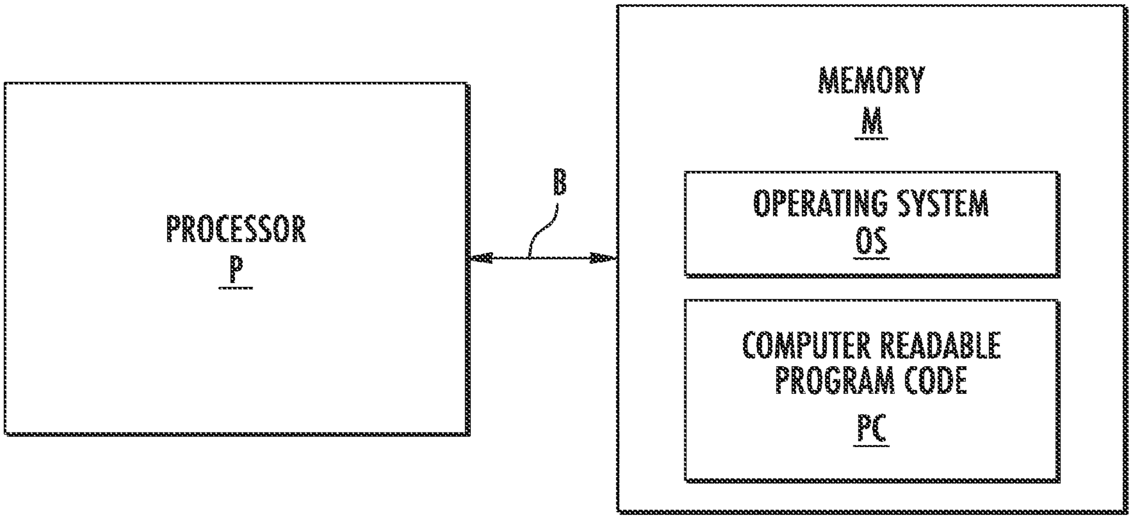
FIG. 4B is a block diagram that illustrates details of an example processor and memory that may be used in the power controller of FIG. 4A.

FIG. 4B is a block diagram that illustrates details of an example processor P and memory M that may be used in the power controller 250 of FIG. 4A. The processor P communicates with the memory M via an address/data bus B. The processor P may be, for example, a commercially available or custom microprocessor. Moreover, the processor P may include multiple processors. The memory M may be a non-transitory computer readable storage medium and may be representative of the overall hierarchy of memory devices containing the software and data used to implement various functions of the power controller 250 as described herein. The memory M may include, but is not limited to, the following types of devices: cache, ROM, PROM, EPROM, EEPROM, flash, static RAM ("SRAM"), and dynamic RAM ("DRAM").

As shown in FIG. 4B, the memory M may hold various categories of software and data, such as computer readable program code PC and/or an operating system OS. The operating system OS controls operations of the power controller 250. In particular, the operating system OS may manage the resources of the power controller 250 and may coordinate execution of various programs by the processor P. For example, the computer readable program code PC, when executed by a processor P of the power controller 250, may cause the processor P to control the operation(s) illustrated in Block 540 of the flowchart of FIG. 5A FIGS. 5A-5D are flowcharts illustrating operations of delivering electric power to equipment 290 (FIG. 2) of a communications access network, according to embodiments of the present inventive concepts. As shown in FIG. SA, the operations may include generating (Block 520) an AC power signal having a frequency between about 10 kHz and about 500 kHz that is transmitted via a coaxial cable 245 (FIG. 2) that is coupled between a the equipment 290 and a power monitor 240 (FIG. 2). For example, the signal may include AC power AP (FIG. 2) that is generated by a resonant converter 230 (FIG. 2) and transmitted to a voltage rectifier 270 (FIG. 2) via the cable 245.

Subsequently, the power monitor 240 may identify (i.e., detect (Block 530)) a reflection RP (FIG. 2) of the AC power signal. Specifically, the reflection RP may be provided to the power monitor 240 via the cable 245. In response to identifying the reflection RP, a power controller 250 (FIG. 2) may control the resonant converter 230 to adjust (Block 540) a voltage (and/or current) of the AC power signal.

A spring-loaded pin 350 (FIG. 3A) at an end of the cable 245 may be electrically connected to the power monitor 240 or to the voltage rectifier 270. In particular, by compressing a spring 340 (FIG. 3A) at the end of the cable 245 when attaching the cable 245 to a connector 345 (FIG. 3B) of the power monitor 240 or the voltage rectifier 270, an end 350E (FIG. 3A) of the pin 3 50 may be electrically connected (Block 510) to an end 31 OE (FIG. 3A) of a center conductor 310 (FIG. 3A) of the cable 245. As a result, the center conductor 310 can be electrically connected to the power monitor 240 or the voltage rectifier 270, and thus the cable 245 can transmit the AC power AP to the voltage rectifier 270. DC power DP (FIG. 2) can then be supplied from the voltage rectifier 270 to the equipment 290.

Figure 5A:
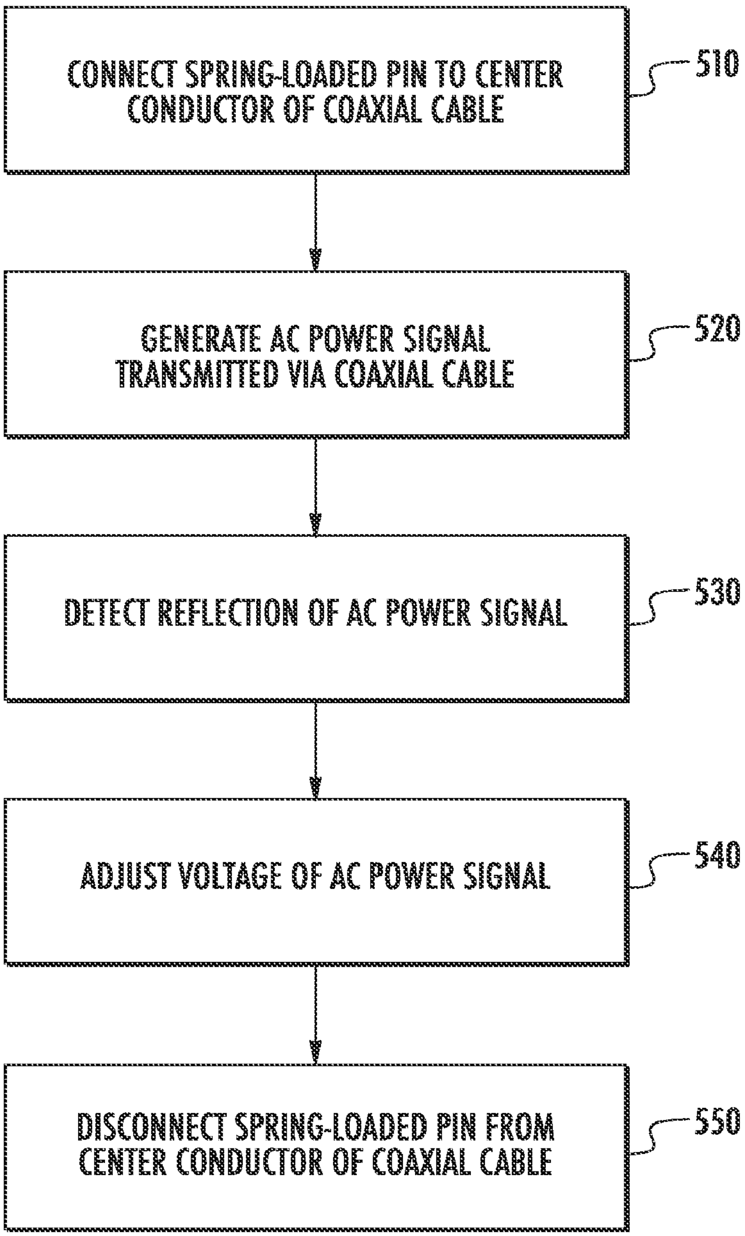
FIGS. 5A-5D are flowcharts illustrating operations of delivering electric power to equipment of a communications access network, according to embodiments of the present inventive concepts.

Though FIG. 5A illustrates connecting the pin 350 to the center conductor 310 before an AC power signal is transmitted via the cable 245, this order may, in some embodiments, be reversed. For example, an opposite end of the cable 245 may already be coupled to the AC power AP before the pin 350 is connected to the center conductor 310. Moreover, the pin 350 may subsequently be disconnected (Block 550) from the center conductor 310. Responsive to detecting a reflection RP (FIG. 2), a power monitor 240 (FIG. 2) can also identify/provide information about the state of a system 200 (FIG. 2), such as information about a break in the cable 245, and then the presence of the reflection RP can lead to reducing the output AC power AP to a lower, safer level. As an example, operations of reflection monitoring may include converting a measured reflection value/coefficient into a time-domain reflectometer ("TDR") type of monitoring information, to determine how far (e.g., from the power monitor 240) the break/discontinuity (or other damage) in the cable 245 is. In some embodiments, a TDR examination may measure electrical characteristics of an RF signal (e.g., electrical characteristics of a reflection thereof at the power monitor 240) to locate the precise damage point.

In other embodiments, instead of using a spring-loaded pin 350, a dielectric cover can be used that blocks access to the end 310E of the center conductor 310. Only by inserting the cable 245 into a mating connector (e.g., the connector 345) can the cover be moved out of the way so that the end 310E can be coupled to (e.g., in physical contact with) the mating connector.

Figure 5B:
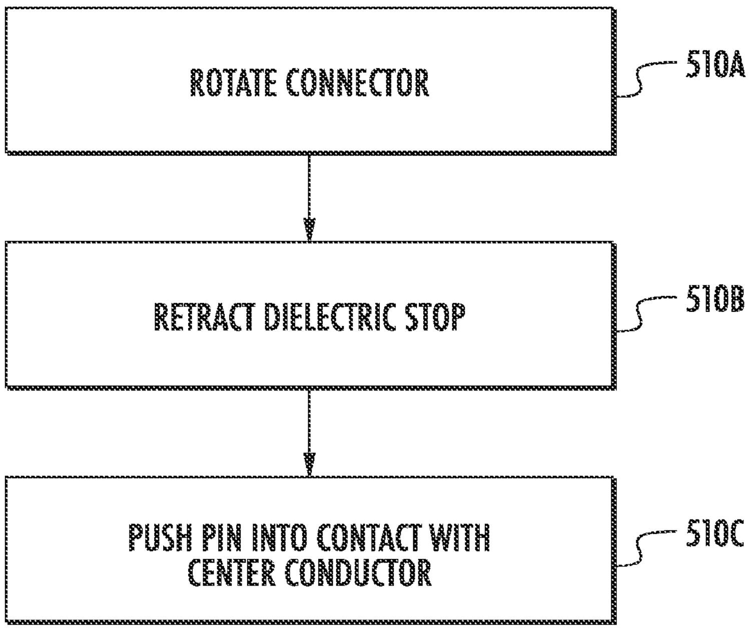

Referring to FIG. 5B, an operation of connecting (Block 510) the pin 350 to the center conductor 310 may include rotating (Block 510A) a connector 360 (FIG. 3A) that is on the end of the cable 245. For example, the connector 360 may include a rotatable bayonet connector. In some embodiments, the cable 245 may include a movable dielectric stop 352/354 (FIG. 3E) that can be retracted (Block 510B) in response to rotating the connector 360. The pin 350 can then be pushed (Block 510C) through a gap 353 (FIG. 3E) of the stop 352/354 into physical contact with the center conductor 310.

Figure 5C:
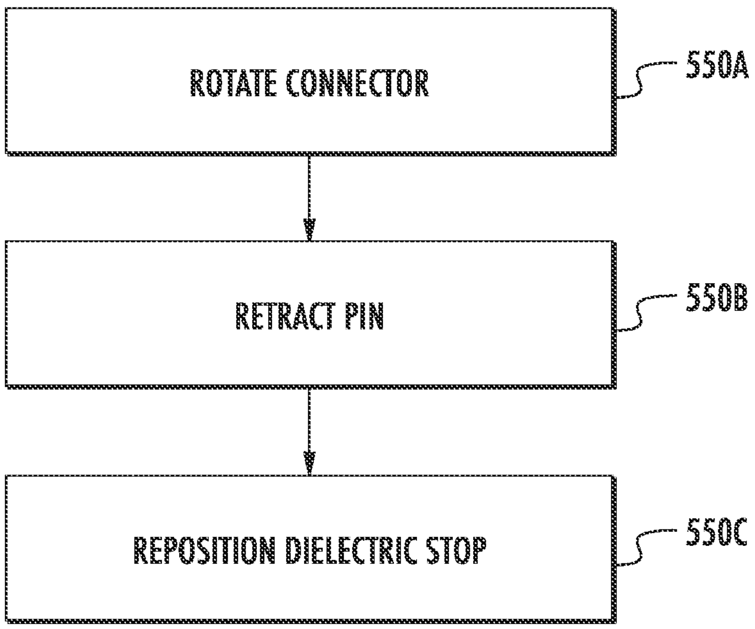
Figure 5D:
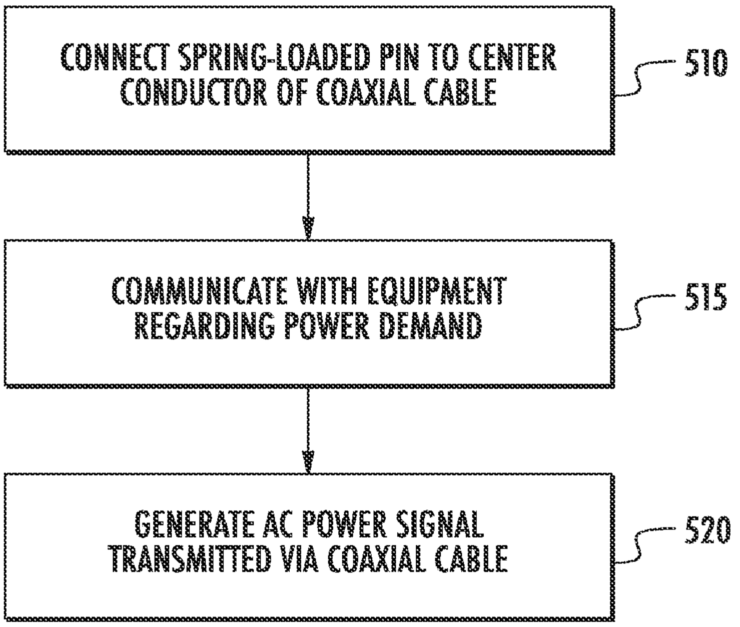

Referring to FIG. 5C, an operation of disconnecting (Block 550) the pin 350 from the center conductor 310 may include rotating (Block 550A) the connector 360. For example, the pin 350 may be retracted (Block 550B) through the gap 353 of the stop 352/354 away from the center conductor 310 in response to rotating the connector 360. The stop 352/354 can then be repositioned/expanded (Block 550C) in the gap 353, as shown in FIG. 3F.

Referring to FIG. SD, a system 200 (FIG. 2) that includes the resonant converter 230 can communicate (Block 515) with the equipment 290 regarding power demand DMD (FIG. 2). For example, the equipment 290 may transmit an indication of its demand DMD to the power controller 250. Moreover, in some embodiments, the system 200 can ping the equipment 290 to request the indication of the demand DMD. For example, the system 200 may ping the equipment 290 via the cable 245 after connecting the pin 350 to the center conductor 310.

A system 200 (FIG. 2) that uses a coaxial cable 245 (FIG. 2) to deliver power with frequencies ranging from about 10 kHz to about 500 kHz to network equipment 290 (FIG. 2) according to embodiments of the present inventive concepts may provide a number of advantages. These advantages include increased safety, as such frequencies can reduce the chance of shocking/killing a person. In some embodiments, the cable 245 may further increase safety by using a spring-loaded pin 350 (FIG. 3A) to make and break an electrical connection with a center conductor 310 (FIG. 3A). Moreover, because the cable 245 is a coaxial cable rather than a cable comprising wire pairs, the cable 245 may advantageously reduce cost and signal leakage. Leakage may otherwise be problematic at high frequencies, and the cost of wire pairs, which typically use more-expensive metal than coaxial cables, can be prohibitively high.

In some embodiments, the system 200 can advantageously monitor, such as using a power monitor 240 (FIG. 2), at/near a power source (e.g., adjacent a resonant converter 230 (FIG. 2)) whether power is being reflected back toward the power source. Accordingly, the system 200 can tune/modulate a voltage (and current) of a power signal at the power source in response to the monitoring, and can thereby achieve impedance matching between the power source and a load.

The present inventive concepts have been described above with reference to the accompanying drawings. The present inventive concepts are not limited to the illustrated embodiments. Rather, these embodiments are intended to fully and completely disclose the present inventive concepts to those skilled in this art. In the drawings, like numbers refer to like elements throughout. Thicknesses and dimensions of some components may be exaggerated for clarity.

Spatially relative terms, such as "under," "below," "lower," "over," "upper," "top," "bottom," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the example term "under" can encompass both an orientation of over and under. The device may be otherwise oriented (rotated 90 degrees or at other orientations) and the spatially relative descriptors used herein interpreted accordingly.

Herein, the terms "attached," "connected," "interconnected," "contacting," "mounted," and the like can mean either direct or indirect attachment or contact between elements, unless stated otherwise.

Well-known functions or constructions may not be described in detail for brevity and/or clarity. As used herein the expression "and/or" includes any and all combinations of one or more of the associated listed items.

The terminology used herein is for the purpose of describing particular embodiments only and is not intended to be limiting of the present inventive concepts. As used herein, the singular forms "a," "an," and "the" are intended to include the plural forms as well, unless the context clearly indicates otherwise. It will be further understood that the terms "comprises," "comprising," "includes," and/or "including" when used in this specification, specify the presence of stated features, operations, elements, and/or components, but do not preclude the presence or addition of one or more other features, operations, elements, components, and/or groups thereof.

That which is claimed is:

1. A system that is configured to deliver electric power to equipment of a communications access network, the system comprising:

a coaxial cable that is coupled between a power generator and the equipment of the communications access network, and that is configured to deliver alternating current (AC) power having a frequency between 10 kilohertz (kHz) and 500 kHz;

a voltage rectifier coupled between a second end of the coaxial cable and the equipment of the communications access network, and configured to convert the AC power to DC power;

a power monitor coupled between the AC power source and the coaxial cable;

wherein the power generator comprises an AC power source configured to generate a signal having the frequency between 10 kHz and 500 kHz, wherein the power generator further comprises a direct current (DC) power source, and wherein the AC power source is coupled between a first end of the coaxial cable and the DC power source; and wherein the power monitor is configured to identify a reflection of the signal via the coaxial cable to the power monitor; and wherein the AC power source is configured to adjust an AC voltage that it outputs, in response to the power monitor identifying the reflection.

2. The system of claim 1, wherein the AC power source comprises a resonant converter that is configured to adjust the AC voltage.

3. The system of claim 1, wherein the AC power comprises a voltage of 250 Volts or higher.

4. The system of claim 1, wherein an end of the coaxial cable comprises a spring.

5. The system of claim 4, wherein the spring comprises a dielectric spring that extends around a center conductor pin having an end that faces an end of a center conductor of the coaxial cable, wherein the end of the center conductor is electrically connected to the end of the center conductor pin when the dielectric spring is compressed, and wherein the end of the center conductor is electrically disconnected from the end of the center conductor pin when the dielectric spring is relaxed.

6. The system of claim 5, wherein the end of the center conductor protrudes beyond an end of an inner dielectric insulator of the coaxial cable and comprises an arc-suppression material that is different from a material of a portion of the center conductor that is surrounded by the inner dielectric insulator, and wherein a connector on the end of the coaxial cable extends around the end of the center conductor and the end of the center conductor pin.

7. The system of claim 5, further comprising a bayonet connector on the end of the coaxial cable, wherein the bayonet connector extends around the end of the center conductor pin.

8. The system of claim 4, wherein the spring comprises a metal spring that extends around a center conductor pin having an end that faces an end of a center conductor of the coaxial cable, wherein the end of the coaxial cable further comprises an annular dielectric ring that is inside the metal spring or between the metal spring and the end of the center conductor, wherein the end of the center conductor is electrically connected to the end of the center conductor pin when the metal spring is compressed, and wherein the end of the center conductor is electrically disconnected from the end of the center conductor pin when the metal spring is relaxed.

9. The system of claim 8, further comprising a bayonet connector on the end of the coaxial cable, wherein the bayonet connector extends around the annular dielectric ring and the end of the center conductor pin.

10. The system of claim 1, wherein the equipment comprises outdoor equipment of the communications access network.

11. The system of claim 1, further comprising a fiber cable that is coupled to the coaxial cable, wherein the fiber cable and the coaxial cable are both coupled between the power generator and the equipment of the communications access network.

12. A coaxial cable comprising:

a center conductor;

a center conductor pin having an end that faces an end of the center conductor; and a spring made of metal that extends around the center conductor pin;

a movable dielectric stop that is between the spring and the end of the center conductor; and a bayonet connector that extends around the movable dielectric stop and the end of the center conductor pin;

wherein the end of the center conductor is electrically connected to the end of the center conductor pin when the spring is compressed, wherein the end of the center conductor is electrically disconnected from the end of the center conductor pin when the spring is relaxed; and wherein the movable dielectric stop is configured to retract from between the end of the center conductor pin and the end of the center conductor, in response to rotating the bayonet connector.

13. The coaxial cable of claim 12, wherein the spring comprises a dielectric spring.

14. The coaxial cable of claim 13, further comprising:

an inner dielectric insulator that surrounds a portion of the center conductor; and a connector that extends around the inner dielectric insulator, the end of the center conductor, and the end of the center conductor pin, wherein the end of the center conductor protrudes beyond an end of the inner dielectric insulator and comprises an arc-suppression material that is different from a material of the portion of the center conductor that is surrounded by the inner dielectric insulator.

15. The coaxial cable of claim 12, further comprising a bayonet connector that extends around the end of the center conductor pin.

16. The coaxial cable of claim 12, further comprising an annular dielectric ring that is inside the spring or between the spring and the end of the center conductor, wherein the spring comprises a metal spring.

17. The coaxial cable of claim 16, further comprising a bayonet connector that extends around the annular dielectric ring and the end of the center conductor pin.

18. A method of delivering electric power to equipment of a communications access network, the method comprising:

generating an alternating current (AC) power signal having a frequency between 10 kilohertz (kHz) and 500 kHz that is transmitted via a coaxial cable that is coupled between the equipment and a power monitor;

identifying, using the power monitor, a reflection of the AC power signal via the coaxial cable to the power monitor; and adjusting a voltage of the AC power signal in response to identifying the reflection.

19. The method of claim 18, wherein generating the AC power signal is performed by a resonant converter that is coupled between a direct current (DC) power source and the power monitor, and wherein adjusting the voltage is performed by the resonant converter.

20. The method of claim 18, further comprising:

electrically connecting an end of the coaxial cable to the power monitor or to a voltage rectifier that is coupled between the equipment and the coaxial cable, wherein the end of the coaxial cable comprises:

a center conductor;

a center conductor pin having an end that faces an end of the center conductor; and a spring that extends around the center conductor pin, and wherein electrically connecting the end of the coaxial cable comprises compressing the spring to electrically connect the end of the center conductor pin with the end of the center conductor.

21. The method of claim 20, further comprising:

retracting a dielectric stop from between the end of the center conductor pin and the end of the center conductor, in response to rotating a bayonet connector that is on the end of the coaxial cable.

22. The method of claim 18, further comprising:

identifying a break in the coaxial cable in response to identifying the reflection.

23. The method of claim 22, wherein identifying the break comprises locating a position of the break in the coaxial cable in response to identifying the reflection.

24. The method of claim 22, wherein adjusting the voltage comprises reducing the voltage in response to identifying the break.

* * * * *